Oct. 11, 1966

P. CARPIGIANI 3,277,930

AUTOMATIC SLOT MACHINE FOR THE MANUFACTURE AND DISTRIBUTION OF PASTY SUBSTANCES

Filed Jan. 7, 1964

Inventor

POERIO CARPIGIANI

By Imirie & Smiley

Attorneys

Inventor
POERIO CARPIGIANI
By Imirie & Smiley
Attorneys

Inventor
POERIO CARPIGIANI
By *Imrie & Smiley*
Attorneys

Oct. 11, 1966 P. CARPIGIANI 3,277,930
AUTOMATIC SLOT MACHINE FOR THE MANUFACTURE AND
DISTRIBUTION OF PASTY SUBSTANCES
Filed Jan. 7, 1964 5 Sheets-Sheet 4
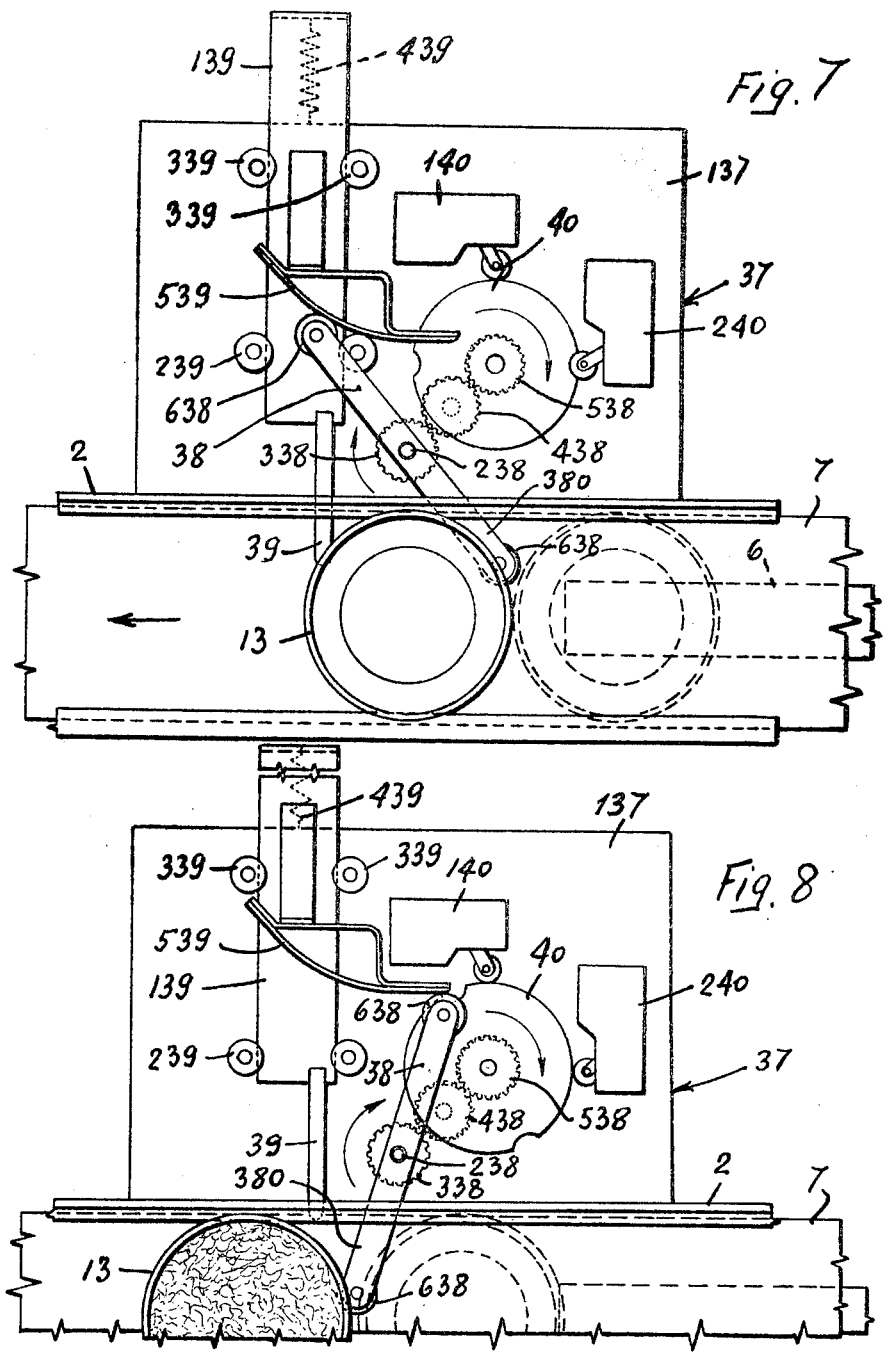
Inventor
POERIO CARPIGIANI
By Imirie & Smiley
Attorneys

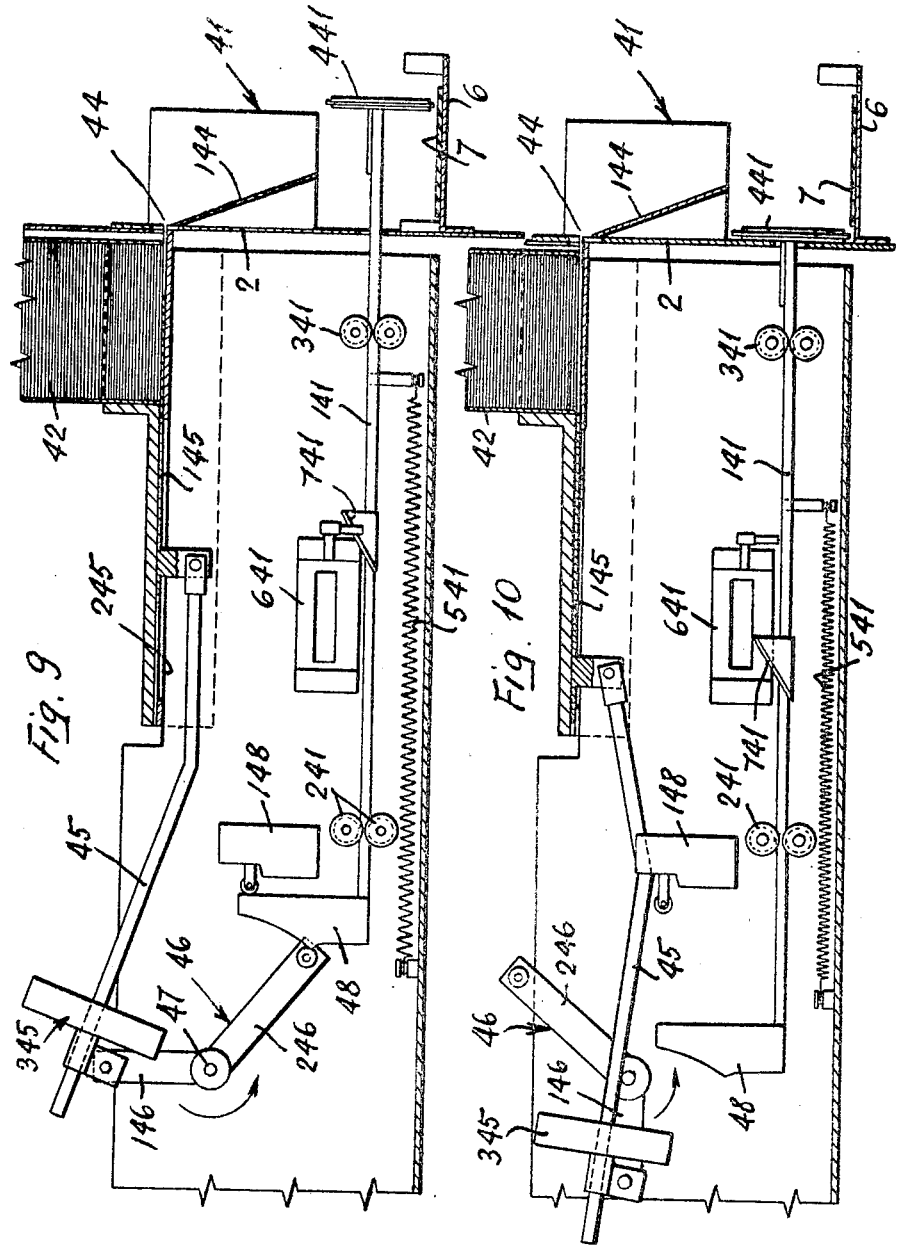

United States Patent Office 3,277,930
Patented Oct. 11, 1966

3,277,930
AUTOMATIC SLOT MACHINE FOR THE MANUFACTURE AND DISTRIBUTION OF PASTY SUBSTANCES
Poerio Carpigiani, Bologna, Italy, assignor to APAW S.A., Fribourg, Switzerland, a joint-stock company
Filed Jan. 7, 1964, Ser. No. 336,245
Claims priority, application Italy, Jan. 7, 1963, 750/63
20 Claims. (Cl. 141—174)

This invention relates to an automatic slot machine for the manufacture and sale of ice cream, said machine comprising a continuous ice cream machine, of the so-called expresso type, which is associated with a coin-operated slot unit for distributing the ice cream produced by said ice cream machine.

A characteristic feature of the present invention is that said machine comprises an endless belt conveyor which functions continuously during the whole operating cycle of the machine, during which an empty cup is deposited on said conveyor belt at a cup feed station is stopped by retractable abutment means at a station in which the ice cream is poured into said cup and is conveyed to a station in which a spoon is inserted into the ice-cream which fills the cup, whereafter the said cup is ejected outside the machine.

Further details of the improved machine according to the present invention will better appear hereinafter, in the course of the following detailed specification thereof, made with reference to the accompanying drawings, which show as nonlimiting example, a preferred embodiment of the present invention and wherein:

FIGURE 7 is a plan view of the retractable abutment means in the empty cup-stopping position at the ice cream delivery station.

FIGURE 8 is a view like the one of FIGURE 7, with the abutment means in cup-releasing position.

FIGURE 9 is a side view of the spoon delivery device at the filled cups-ejecting station, the cup-ejecting plate being in rest position.

FIGURE 10 is a view like the one in FIGURE 9, showing cup-ejecting plate ready for ejecting a cup.

FIGURE 11 is a sectional view in enlarged scale of a detail of the spoon-feeding device shown in FIGURES 9 and 10.

Figure 1:
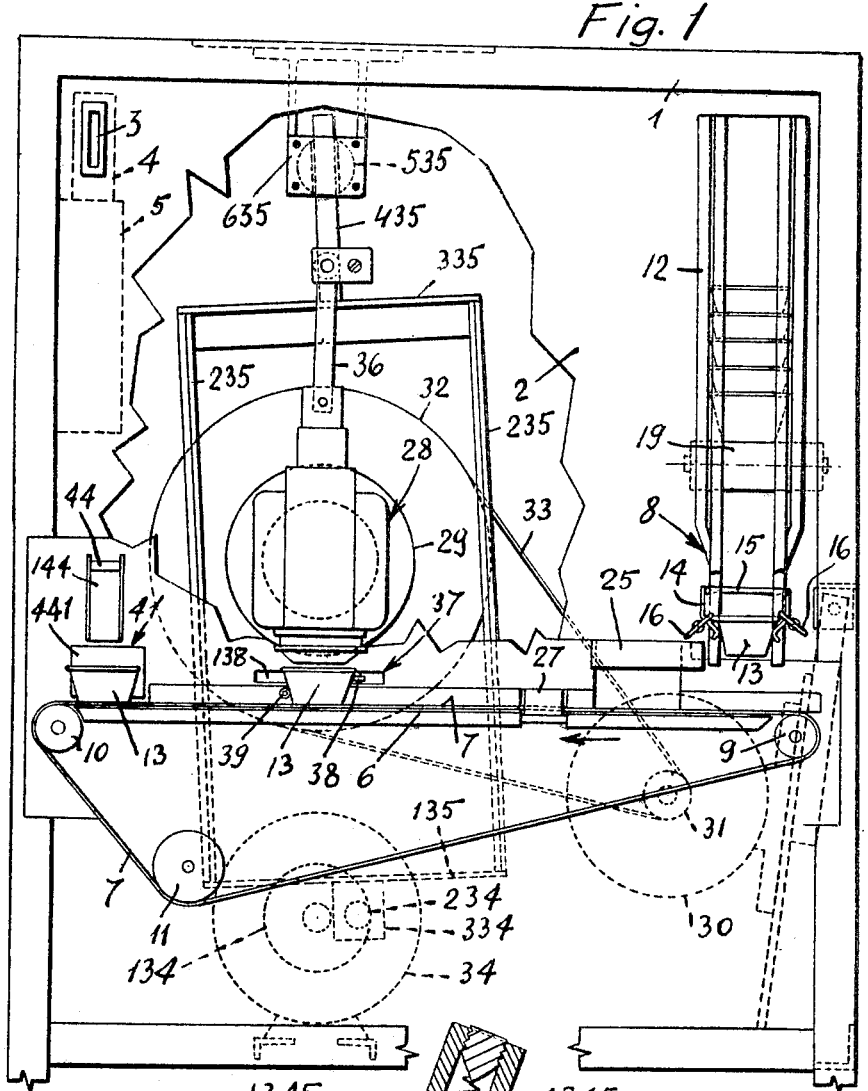
FIGURE 1 is a front view of the machine, with the front panel of same partially broken away.

With reference to the drawings, and with particular reference to FIGURE 1 thereof, 1 denotes the cabinet in which the machine is housed and which is closed at its front by a panel 2 which, in its turn, is closed by a suitable door (not shown). Reference numeral 3 denotes the coin-receiving slot unit which may be of any conventional construction and communicating through the coin conveying channel 4 with the coin-collecting box 5.

To the front panel 2 a horizontal guide plate 6 is fastened upon which the upper run of a belt conveyor 7 runs upon rollers 9 and 10 with the interposition of a tensioning roller 11. Along and above said belt 7 there are arranged the empty cup-feed station, the empty cup feeling station, the ice cream delivery station and the spoon-feed and cup-ejecting station, which will be particularly described hereinafter.

Figure 2:
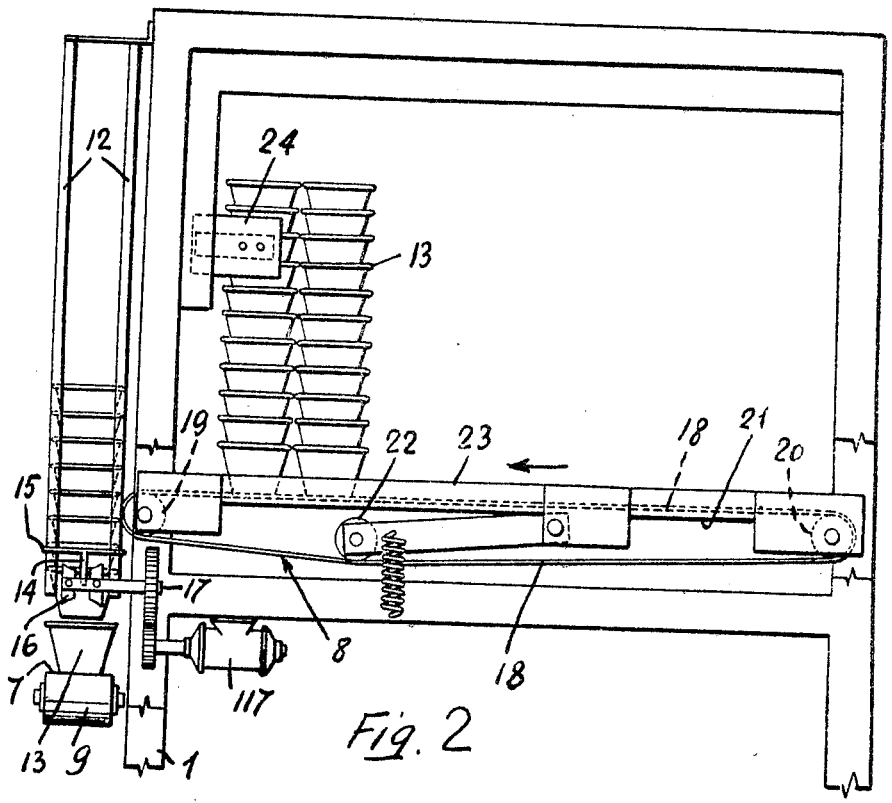
FIGURE 2 is a right-hand side view of the machine as shown in FIGURE 1, with parts in section.
Figure 3:
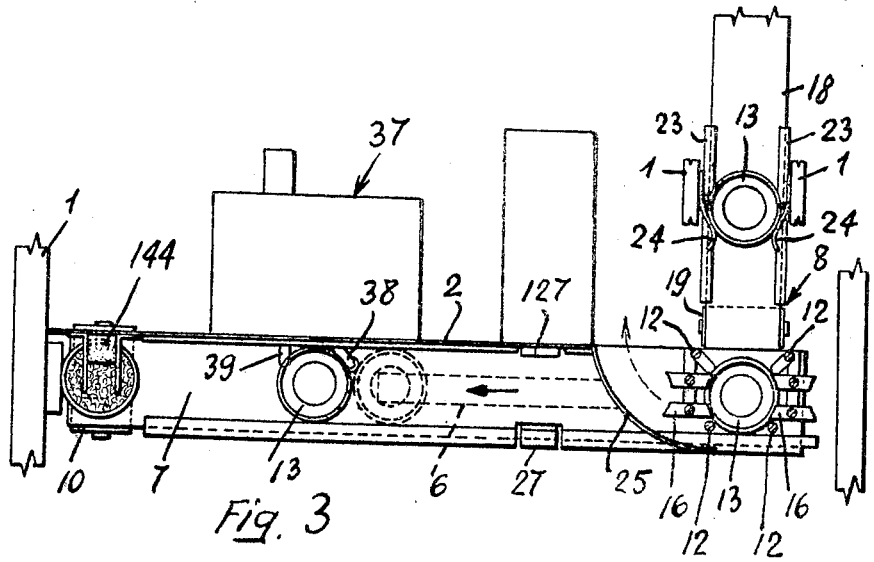
FIGURE 3 is a diagrammatic plan view of the transversal cup-conveyor plane, together with the elements associated therewith and the cup stacks feed conveyor.

Referring particularly to FIGURES 1, 2 and 3 of the drawings, the cup feed station comprises a vertical cage-like magazine 12 for a stack of cups being distributed. This magazine formed, in the example as shown, by four upright rods fitted at the bottom end of the magazine at the apices of a square inscribed in the major circumference of the cups 13, the two rear rods being arranged so as to diverge outwardly starting from a certain height of the magazine, so as to allow the passage into the magazine 12 of a fresh cup stack which is fed by a cup stacks-feed device which will be described hereinafter. At the bottom end of cage 12, a pair of spring fingers 14 are provided, fastened at one end to a ring 15 screwed to cage 12. The free ends of said fingers 14 project inwardly, under the rim edge of the lowermost cup of the stack 13, so as to prevent the whole stack from falling upon the underlying conveyor belt.

For the feeding of a single cup at a time onto the conveyor belt 7, two flap members 16 are provided, each of which is mounted upon a small shaft 17 driven through a suitable drive by a motor 117 so as to effect one-half turn at each cup feed cycle. Said flaps 16 are mounted at opposite sides of the cup stack 13, at the height of the edge of the last cup of the pile and at each operation they engage the edge of the last cup and push same downwardly, beneath fingers 14, onto the upper run of belt 7.

For refilling the magazine 12 with cup stacks, a refilling device has been provided which is mounted upon the machine side contiguous to the cup feed station. This device, which is particularly shown in FIGURES 2 and 3, comprises an endless conveyor belt 18 mounted upon rollers 19 and 20, passing with its upper run above the supporting plate 21 and tensioned by a tensioning roller 22. Above belt 18, a pair of fixed guide members 23, are provided. The feeding of the last complete cup stack 13 on conveyor belt 18 takes place automatically as soon as the height of the stack within the magazine 12 falls below a predetermined level, which is detected by a feeler of a conventional design (not shown), which starts the operation of belt 18 and stops same as soon as the cup stack has been discharged into magazine 12, in which, therefore, the predetermined cup level has been restored.

For preventing the next cup stack on the conveyor belt 18 from being overturned on belt 18 after the feeding of the preceding stack into magazine 12, a pair of retaining leaf springs 24 is secured to the machine frame at a certain height above the conveyor belt 18, and slightly projecting with their free ends from opposite sides into the path of travel of said stacks, so as to gently clamp the last cup stack at the delivery end of the said belt 18, holding same in upright position.

The cup feed station is finally completed by a cup-discarding station, for the case in which the feed device 16 feeds two or more cups at a time. For this purpose, at a height a little above that of a single cup, an abutment member 25 is provided, arranged transversally to, and inclined with respect to the direction of travel of conveyor against which abut the defective cups which are shifted sidewise and discharged into a suitable waste bin (not shown) through an outlet opening. Reference numerals 27 and 127 denote a pair of feeler members projecting from opposite sides of the path of the cups 13 from the cup feed station to the ice cream delivery station, and forming part of a feeler device which will be better described hereinafter.

Figure 4:
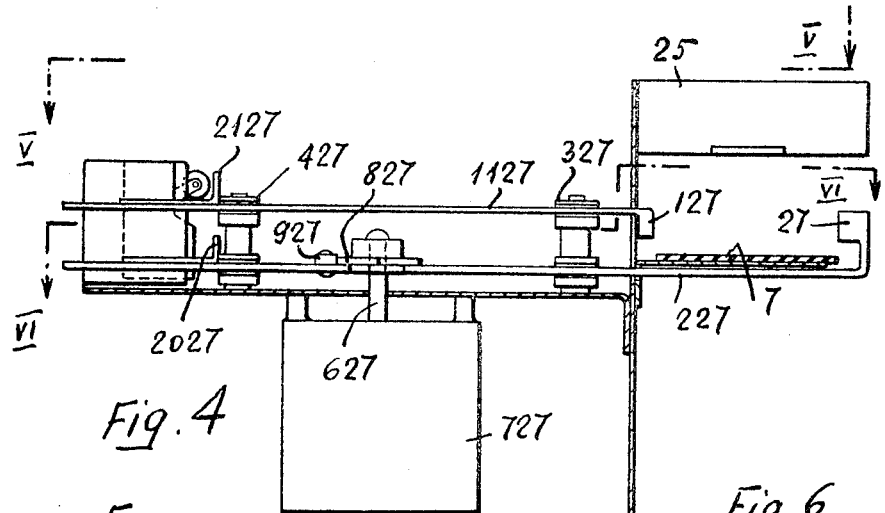
FIGURE 4 is a side view of the empty cups feeler device, in enlarged scale.
Figures 5, 6:
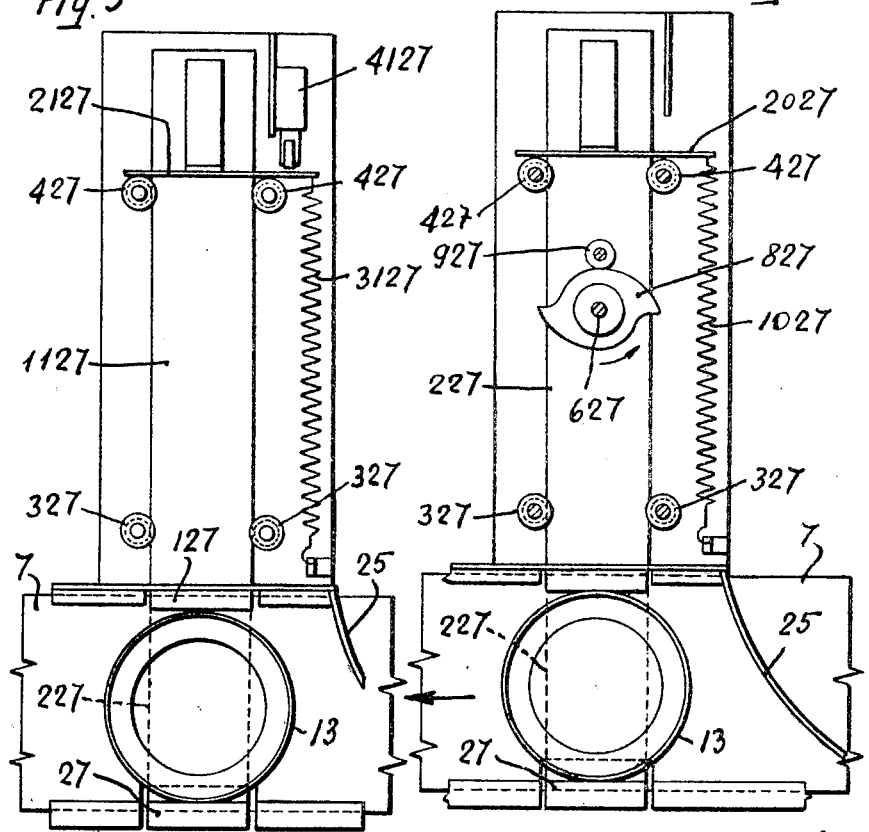
FIGURE 5 is a top plan view of the device shown in FIGURE 4, taken from the plane of line V—V of FIGURE 4.
FIGURE 6 is a top plan sectional view of the device shown in FIGURE 4 taken along the plane of line VI—VI of FIGURE 4.

The said feeler device, as best shown in FIGURES 4, 5 and 6, comprises a first feeling member 27, in the form of an inverted L-shaped plate, having its vertical wing secured by its end to a bar 227, and with its horizontal wing projecting inwardly above the upper run of belt 7. The bar 227 extends below the said upper run of belt 7 through a suitable slit in the front panel 2 of the machine, and is slidably guided for a reciprocating movement in horizontal plane between two pairs of vertical idle rollers 327, 427, provided with a first set of circumferential grooves between which the side edges of bar 227 are guided. The bar 227 is provided with a longitudinal slit 527 through which the shaft 627 of an electric motor 727 is guided, the said motor being fastened to a suitable supporting plate secured to the machine frame. On the end of said shaft, projecting through the slit 527, a suitable two-lobed cam 827 is secured, operatively cooperating with an idle roller 927 secured to the bar 227. A spring 1027 secured between a fixed part of the machine frame and a link 2027 sidewise projecting from, and secured to, bar 227, continuously urges bar 227 in one direction in which roller 927 is in operative contact with cam 827. Anticlockwise rotation of cam 827 will therefore impart a reciprocating movement to bar 227 and feeler member 27, so that the horizontal flange of said member will periodically projecting into the path of the cups on belt 7.

The second feeler member of the feeling device comprises a plate 127 secured to one end of a bar 1127. Said plate 127 is facing the projecting plate of feeler 27, at the opposite side of belt 7.

The bar 1127 is slidably guided in a second set of circumferential grooves of the guide rolls 327 and 427, and is provided at its innermost end with a member 2127 sidewise projecting from bar 1127, to which one end of a spring 3127 is secured, the other end of spring 3127 being secured to a fixed part of the machine frame. The said member 2127 act as an abutment against rollers 427, to limit the sliding movement of bar 1127 under the action of spring 3127 by a fixed amount, so that flange 127 will project only by a given amount into the path of travel of the cups on the belt 7. Behind abutment member 2127, substantially in contact therewith, the actuating element of a push-button switch is disposed, controlling the empty cups delivery, as it will be better explained later. The operation of the just described feeler device is evident. Whenever a cup is traveling between plates 127 and 127, plate 27 will be pushed inwardly by the cup thus causing bar 1127 to slide inwardly against the action of spring 3127, thus operating through the abutment 2127 the switch 4127. When on the contrary a cup is not present on the belt 7, between plates 27 and 127, switch 4127 will not be operated, and the cup delivery device will be operated until an empty cup is sensed by the just-described feeling device.

The ice cream delivery station comprises a dosing dispenser 28, for example of the type of the piston dispenser described in my U.S. Pat. No. 3,149,756, and to which reference is made for a detailed description of such a part and its operation. This piston dosing dispenser is of the kind adapted to deliver at the same time a dosed quantity of ice cream and of a flavoring syrup, which latter is fed from a suitable tank (not shown). The ice cream, instead, is fed to the piston dosing dispenser 28 directly from the freezing cylinder 29 of a continuous ice cream machine of a known type, and for instance ice cream machine of the kind described in my Patent No. 3,018,641. 30 is an electric motor which operates through pulleys 31 and 32 and belt 33 the mixer arranged within chamber 29. The piston of the dispenser 28 is operated at each revolution of motor 34. To this end, on the shaft of motor 34 a disc 134 is keyed, carrying a crankpin 234 rotatably housed inside a bushing 334 secured to the midpoint of a cross bar 135. At each end of bar 135 a pair of rods 235 are fastened, extending upwardly up to a distance so as to straddle cylinder 29. A second cross bar 335 is fastened to the upper ends of the rods 235, thus forming a rectangular frame. From the midpoint of bar 335 a guide rod 435 projects upwardly, the said guide rod 435 being slidably guided inside an axial through bore formed in a ball 535 rotatably supported inside a suitable bearing 635 secured to the machine frame. To the guide rod 435 one end of a connecting rod 36 is articulated, the other end of which is articulated to the upper end of the piston of the piston dispenser 28. It is thus evident that at each revolution of the disc 134, the piston of the piston dispenser will effect a complete stroke and dispense a dose of ice cream, as described in my said Pat. No. 3,149,756.

In order to maintain the cups 14 in their correct position beneath piston 28, even with the belt 7 running, a suitable barring device 37 is provided, comprising a turnstile like lever 38–380 and an abutment rod 39. The said barring device will be now described with reference to FIGURES 7 and 8 of the accompanying drawings.

As shown in FIGURES 7 and 8, a horizontal slit 138 is formed in the front panel 2 of the machine, at a certain height above the upper run of belt 7, which is smaller than the height of the cups being entrained on said belt. Through said slit the arms of a double-armed lever 38–380, fulcrumed on shaft 238 rotatably supported by base plate 137, project. To said shaft 238 a gear 338 is keyed, meshing through an intermediate gear 438 with a gear 538 keyed on a motor (not shown). Lever 38–380 is provided at each end with a roller 638, for the purposes which will be explained later. In a position behind shaft 238, in the direction of movement of the belt 7, an abutment rod 39 rests in a position in which the rod 39 is projecting through the opening in panel 2 thus intercepting and stopping the cups being conveyed on belt 7. A fixed cam sector 539 is secured to the bar 139, in such a position so as to coact with either of rollers 638 of lever 38–380. Thus, during rotation of lever 38–380, whenever a roller 638 at the end of one of the lever arms comes into engagement with cam sector 539 (FIGURE 7) the bar 139 is pushed rearwardly against the action of spring 439, thus retracting the rod 39 out of the path of the cups on belt 7. At the same time, the other arm of lever 38–380, which projects through slit 138, is stopping any cup on belt 7, whilst pushing the just filled cup toward the subsequent station.

After having fully retracted the rod 39, and having positively pushed the filled cup away from the ice cream dispensing station, the roller on lever arm 38, continuing its rotation, rolls off cam 539, so that the abutment rod is again pulled by the spring 439 in its cup-intercepting position, whilst lever 38–380 is returned to its starting position (FIGURE 7), in which an empty cup is trapped between either one of arms 38–380 and rod 39.

A suitable cam 40, keyed on the shaft of the actuating motor of lever 38–380 controls the switches 140 and 240, which stop the motor of lever 38–380, and starts the operation of spoon-dispensing and cups-ejecting means.

The final station, or ejecting station for the complete ice cream cups, comprises the ejector proper 41 and the unit for feeding a spoon onto the ice cream which comes to be at that station. This unit is shown in FIGURES 9, 10 and 11, to which reference will be made. 42 denotes a vertical magazine in which the spoons are stacked. The bottom of said magazine is provided at its front with a spoon-dispensing slit 44 which opens at a level above the level of the ice cream filled cups fed at the ejecting station.

A plate 145 is slidably mounted between a pair of guide members 245 adjoining the bottom of magazine 42, in the plane of the split 44. A transmission rod 45 is linked at one end to plate 45, and at the opposite end, through a suitable friction coupling 345, to one arm 146 of a bell-crank lever 46 keyed onto shaft 47, which is driven by a suitable electric motor (not shown).

The ejector 41 comprises a bar 141 slidably guided in a horizontal plane between two pairs of guide rollers 241, 341, and projects with its front end through panel 2 into the path of the cups on belt 7. On the front end of bar 141 a substantially rectangular ejecting plate is secured, which ejects the filled cups on belt 7 out the machine, by pulling same transversally along the belt 7, whilst providing in its rest position (FIGURE 9) a closure for the cup outlet opening provided in the front door of the machine (not shown). On the rear end of bar 141 a cam-shaped abutment member 48 is provided, against which the arm 246 of bell crank lever 46 strikes during rotation of said lever, as will be explained later. A spring 541, secured at one end to a fixed part of the machine frame and at its other end to bar 141, urges said bar to its fully retracted position, viz, the position shown in FIGURE 10. 641 is a meter of a well known kind, which is operated by the reciprocating movement of bar 141 through a wedge-shaped cam 741 secured to bar 141 in a suitable position.

The operation of the just-described device is apparent. With the device in rest position, as shown in FIGURE 9, bar 141 is held in its fully outwardly projecting position by abutment of lever arm 246 of bell crank lever 46 against cam 48. In this position, cam 48 actuates also switch 148 and stops the motor which drives the bell crank lever 46. As soon as the shaft 47 is put into rotation by a suitable motor (not shown) controlled by the ice cream delivery station, lever arm 246 starts riding along cam 48 until it abandons said cam. The bar 141 is pulled rearwardly by spring 541, in the position shown in FIGURE 10. By further rotating bell-crank lever 46, plate 145 is reciprocated through arm 45 thus ejecting the lowermost spoon of the stack out of the slit 44, and the thus ejected spoon falls by gravity along chute 144 onto the underlying cup which has been advanced by belt 7 at the said station.

In completing its rotation, arm 246 of bell-crank lever 46 abuts again on cam 48, thus pushing bar 141 outwardly, against the action of spring 541, thus expelling the filled cup of the machine, until cam 48 again actuates switch 148, thus stopping the rotation of said bell crank lever.

As stated above, the transmission rod 45 is coupled to the bell crank lever arm 146 through a friction coupling 345. Said friction coupling as better shown in FIGURE 11, comprises a T-shaped member, having a bored shank 1345 and a pair of hollow wings 2345. The rod 45 is slidably guided through the bore of the shank 1345. The wings 2345 are closed at their outer end by a threaded plug 5345. Inside each wing 2345 a ball 3345 is slidably housed, said balls being urged in radial direction by a spring 4345. The rod 45 is provided with a circumferential groove 445, in which the said balls 3345 snap whenever the rod is inserted through the axial bore of shank 1345, with a sufficient force as to prevent under normal operating conditions, any sliding of the coupling member 345 along the rod 45.

Should however the spoon ejecting plate 145 fail to slide, the described friction coupling permits that the ice cream ejection operation be completed despite said failure. In fact, should the plate 145 be blocked, the force exerted by bell-crank lever 46 will cause balls 3345 to snap out of groove 445, and the coupling member 345 will ride along rod 45, thus permitting the completion of the cup-ejecting operation.

What is claimed is:

1. An automatic coin-operated machine for dispensing pasty substances such as ice cream, comprising means defining a container feed station, means defining a pasty substance feed station, means defining an ejecting station, an endless conveyor, power means for continuously moving said conveyor sequentially past all of said stations during one coin actuated cycle; means at said container feed station for feeding one empty container at a time onto said conveyor; abutment means for temporarily stopping the movement of the fed container at said pasty substance-feeding station while the conveyor continues to move below the stopped container; means at said pasty substance feeding station for automatically dispensing a dose of pasty substance into a stopped container; means for releasing said abutment means when the stopped container is filled thus permitting the filled container to be again entrained and moved by said conveyor to said ejecting station, means at said ejecting station for stopping a filled container, and ejecting means at said last named station for moving a filled container from said conveyor and out of the machine.

2. A machine according to claim 1, in which said endless conveyor is an endless belt.

3. A machine according to claim 1, in which said abutment means for temporarily stopping the containers beneath the pasty substance feed station, includes abutment bar which intercepts the containers.

4. A machine according to claim 3 wherein said abutment means also includes retaining means for holding at least one filled container ahead of the pasty substance feed station and for positively pushing said filled container toward the ejecting station.

5. Machine according to claim 4, wherein said retaining means are formed by a turnstile-like double-armed lever.

6. A machine according to claim 1 further comprising, in correspondence with said ejecting station, a spoon feed station.

7. Machine according to claim 1 wherein said means for feeding a container comprises means for feeding a cup.

8. Machine according to claim 1, wherein feeler means are provided between said container and pasty substance feed stations for detecting the effective feeding of an empty container onto the conveyor, said feeler means being operative to control the operation of said means for dispensing pasty substance as a consequence of the effective feed of an empty container.

9. A machine according to claim 8, wherein container discarding means are provided, between said container feed station and said feeler means which remove containers from the conveyor which have a height in excess of a predetermined height of a single container.

10. Machine according to claim 9, wherein said containers are cups and said discarding means comprises a lever bar which extends above the whole belt width and which leads the cups whose height is in excess of a single cup into a side outlet opening.

11. Machine according to claim 1 wherein is further provided means for feeding a stack of empty containers to the container feed station, and means for automatically operating said stack feeding means when the height of a stack of containers at the said container feed station is below a predetermined level.

12. Machine according to claim 1, in which said container feed station comprises a vertical magazine which opens above the conveyor surface, means at the bottom of said magazine for removably holding the lowest of the containers stacked within the magazine, and means acting upon the lowest container in the stack to free same from said holding means and allow same to fall upon said conveyor.

13. Machine according to claim 12 wherein said magazine is laterally provided with an opening having a sufficient width and height to permit a stack of containers to pass therethrough, and a container stack-feeding means in the form of a belt conveyor leading to said opening in the magazine, said stack feeding means being operative to move a stack of containers at a time into said magazine.

14. Machine according to claim 1, wherein said pasty substance feed station comprises a dosing dispenser including a dosing piston dispenser connected to an automatic continuous ice cream machine.

15. Machine according to claim 1, wherein said ejecting means comprises a pusher movable transversally of the conveyor belt.

16. Machine according to claim 15, wherein the said pusher is formed by a bar having fastened thereto at its outer end a vertical pushing plate, the said plate acting in the rest position of the pusher, as a closure for a container ejecting port of the machine.

17. Machine according to claim 16 in which said ejecting station comprises means defining a spoon feed station including a spoon magazine for stacking a plurality of spoons, a slit at the bottom of said spoon magazine for permitting the ejection of the lowermost spoon of the stack into underlying container, and a slidable ejector, in the plane of said slit for expelling a lowermost spoon at the end of each cycle.

18. A machine according to claim 8 wherein said feeler means comprises a pair of members disposed above and on opposite sides of said conveyor, means biasing said members for contacting opposite sides of a container moving on and with the conveyor, and switch means operated by one of said members when moved transversally of said conveyor by contact with a container to prevent operation of said container feed means until the conveyor removes the container contacting said members toward the pasty substance feed station.

19. A machine according to claim 1 wherein said abutment means for stopping the fed container at the pasty substance feed section comprises a bar reciprocable over the conveyor, a horizontally disposed lever overlying the conveyor and having cam follower wheels at each end, means for intermittently rotating said lever in a horizontal plane, and a cam secured to said bar for reciprocating the bar when engaged by either one of said follower wheels, whereby upon 180° rotation of said lever a container is stopped between the bar and lever for reception of pasty substance and after feeding of said substance further rotation of the lever through 180° retracts the bar and causes the portion of the rotating lever extending over the conveyor to push a filled container toward said ejection station.

20. A machine according to claim 17 wherein said pusher bar of the ejector means is spring biased longitudinally, a cam being affixed to the inner end of said bar, a rotatable bell crank having one arm engageable with said cam to move said bar against the spring bias, a rod pivoted at one end to said slidable ejector of the spoon feed station, and the other end of said rod being frictionally and pivotally coupled to the other end of said bell crank, said frictional coupling of the bell crank and slidable ejector permitting movement of said pusher bar to eject a filled container even though movement of the slidable spoon ejector is stopped by blockage.

References Cited by the Examiner

UNITED STATES PATENTS

| | | | |
|---|---|---|---|
| 1,913,743 | 6/1933 | Borchert | 141—174 X |
| 1,931,246 | 10/1933 | Barbieri | 141—174 X |
| 1,951,746 | 3/1934 | Bonaccolta et al. | 221—274 |
| 2,333,232 | 11/1943 | Bleam et al. | 141—180 X |
| 2,580,257 | 12/1951 | Tacchella | 141—174 |
| 3,053,387 | 9/1962 | Foss et al. | 209—90 |

FOREIGN PATENTS

| | | |
|---|---|---|
| 1,139,666 | 2/1957 | France. |
| 516,578 | 1/1940 | Great Britain. |

LAVERNE D. GEIGER, *Primary Examiner.*

H. BELL, *Assistant Examiner.*